(12) United States Patent
Mirand et al.

(10) Patent No.: US 7,681,836 B2
(45) Date of Patent: Mar. 23, 2010

(54) AIRCRAFT COMPRISING A DEVICE FOR DETECTION AND/OR MEASUREMENT OF ATMOSPHERIC DISTURBANCES

(75) Inventors: Pierre Mirand, Toulouse (FR); Michel Lacabanne, Tournefeuille (FR)

(73) Assignee: Airbus France, Toulouse (FR)

( * ) Notice: Subject to any disclaimer, the term of this patent is extended or adjusted under 35 U.S.C. 154(b) by 306 days.

(21) Appl. No.: 11/088,768

(22) Filed: Mar. 25, 2005

(65) Prior Publication Data

US 2005/0279888 A1 Dec. 22, 2005

(30) Foreign Application Priority Data

May 25, 2004 (FR) .................................. 04 51019

(51) Int. Cl.
*B64C 1/00* (2006.01)
(52) U.S. Cl. ..................................... 244/129.1; 244/1 R
(58) Field of Classification Search ................ 244/123, 244/75 R, 129.1, 183, 190; 701/14, 17
See application file for complete search history.

(56) References Cited

U.S. PATENT DOCUMENTS

| | | | | | |
|---|---|---|---|---|---|
| 3,362,291 A | * | 1/1968 | Deluca | ........................ | 89/1.817 |
| 3,856,402 A | * | 12/1974 | Low et al. | ................... | 356/5.06 |
| 3,866,055 A | * | 2/1975 | Pike | ............................ | 250/564 |
| 4,483,614 A | * | 11/1984 | Rogers | ....................... | 356/28.5 |
| 4,589,070 A | * | 5/1986 | Kyrazis | ........................ | 701/14 |
| 4,859,055 A | * | 8/1989 | Gal et al. | ....................... | 356/28 |
| 4,905,936 A | * | 3/1990 | Dufresne de Virel et al. | ........................... | 244/130 |
| 5,394,238 A | * | 2/1995 | Mocker et al. | ............... | 356/342 |
| 5,639,964 A | * | 6/1997 | Djorup | ..................... | 73/170.12 |
| 5,826,833 A | * | 10/1998 | Evans et al. | ................... | 244/183 |
| 6,012,675 A | * | 1/2000 | Cocatre-Zilgien | ............ | 244/16 |
| 6,536,711 B1 | * | 3/2003 | Conway et al. | ........... | 244/129.5 |
| 6,715,713 B2 | * | 4/2004 | Marche | ........................ | 244/57 |
| 6,751,532 B2 | * | 6/2004 | Inokuchi | ....................... | 701/14 |
| 6,856,396 B2 | * | 2/2005 | McGuire | ..................... | 356/450 |
| 6,871,816 B2 | * | 3/2005 | Nugent et al. | ............... | 244/3.16 |
| 6,938,855 B2 | * | 9/2005 | Marche | ........................ | 244/54 |
| 7,419,120 B2 | * | 9/2008 | Armand | ........................ | 244/36 |
| 2002/0078545 A1 | * | 6/2002 | Munk et al. | ............... | 29/407.01 |
| 2003/0009268 A1 | * | 1/2003 | Inokuchi | ....................... | 701/14 |
| 2003/0042364 A1 | * | 3/2003 | Tanaka et al. | ................ | 244/123 |
| 2005/0116093 A1 | * | 6/2005 | Machado et al. | .............. | 244/54 |
| 2007/0011970 A1 | * | 1/2007 | Hethcock et al. | ........... | 52/481.1 |

* cited by examiner

*Primary Examiner*—Michael R Mansen
*Assistant Examiner*—Joseph W Sanderson
(74) *Attorney, Agent, or Firm*—Oblon, Spivak, McClelland, Maier & Neustadt, L.L.P.

(57) ABSTRACT

The invention relates to an aircraft comprising a device, for example an optical device, for detection and/or measurement of atmospheric disturbances in the path of the aircraft. This measurement device is placed in the pressurized zone between the aircraft nose and the compartment of the landing gear. It comprises:
 a structure box (18) designed to resist pressurization forces,
 aerodynamic fairing (13).

11 Claims, 2 Drawing Sheets

AIRCRAFT COMPRISING A DEVICE FOR DETECTION AND/OR MEASUREMENT OF ATMOSPHERIC DISTURBANCES

TECHNICAL DOMAIN

The invention relates to an aircraft comprising a device for detection and/or measurement of atmospheric disturbances.

STATE OF PRIOR ART

At the present time, transport aircraft with a hundred seats or more use sensors in the form of small antennas (Pitot tubes, incident probes, etc.), or sensors integrated into the aircraft geometry (for example radome protected radar), to measure atmospheric disturbances. The use of new sensors such as lidars ("light detection and ranging"), for example, requires solutions to different problems: thus, an optical visibility window necessary for such systems introduces more serious installation constraints for example than for cameras.

The purpose of the invention is to integrate a device onboard an aircraft for optical measurement of atmospheric disturbances in the path of the aircraft, this integration being used to acquire disturbance velocities before the disturbance actually reaches the aircraft.

PRESENTATION OF THE INVENTION

The invention relates to an aircraft comprising a device, for example an optical device, for detection and/or measurement of atmospheric disturbances in the path of the aircraft, placed between the aircraft nose and the landing gear, characterized in that this aircraft comprises:
  a structure box designed to resist pressurization forces surrounding the device and located in the pressurized zone,
  aerodynamic fairing that covers this structure box.

Advantageously, the measurement device includes a lidar. The structure box includes a flat glass on the front and is located outside the aircraft under the fairing. The lidar may be in the shape of an <<L>>, the vertical part of the L being located inside the aircraft and the horizontal part of the L being located outside the aircraft and inside the structure box. The lidar may also be formed from two parts located one in line with the other.

DETAILED PRESENTATION OF PARTICULAR EMBODIMENTS

Figure 1:
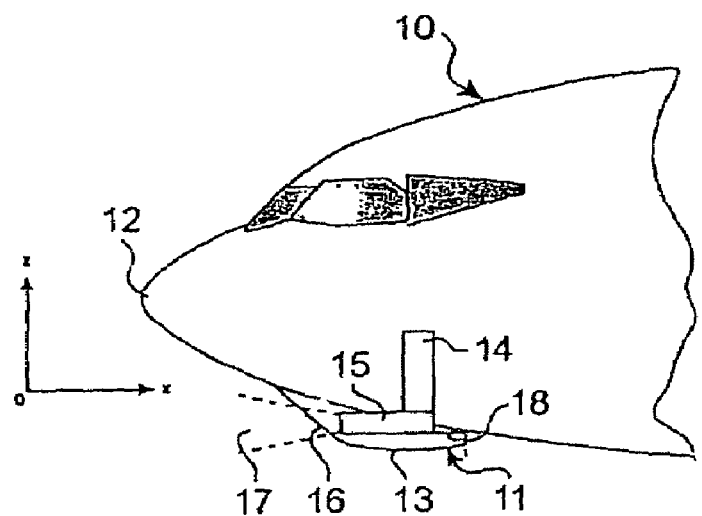
FIG. 1 illustrates an example embodiment of the aircraft according to the invention.

As illustrated on FIG. 1, the aircraft 10 according to the invention comprises a device 11, for example an optical device, for detection and/or measurement of atmospheric disturbances in the path of the said aircraft, for example comprising a lidar.

This device operates in the pressurized zone and is installed in the forward part of the aircraft between the aircraft nose and the landing gear compartment (on the Ox axis) to give detection and/or measurement information sufficiently in advance so that it can be processed and used.

In this example embodiment, this device is in the shape of an <<L>> which minimizes the external part of the aircraft skin. It is also surrounded by a thick caisson (structure box) 18 that will resist pressurization and is itself covered by a fairing 13 to limit the aerodynamic impact.

The device can be installed behind the avionics door 20 to avoid making excessive changes to the aircraft. The vertical part 14 of the L is then located inside this door, and the horizontal part 15 is located outside the unmodified aircraft.

Figure 2:
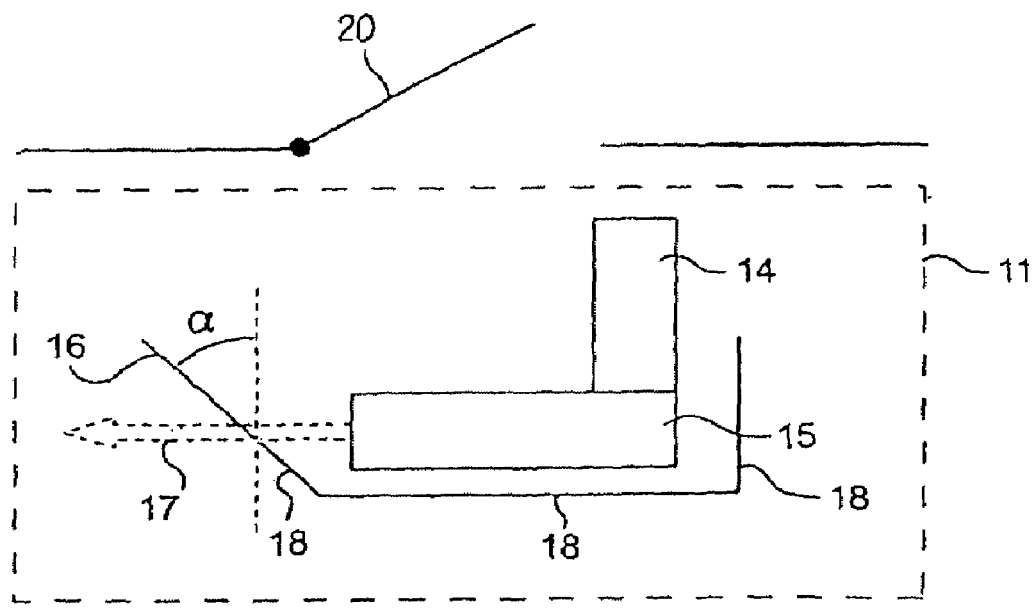
FIG. 2 illustrates the diagram of the structure box in the example shown in FIG. 1.

The device 11 is thus made from two parts:
  the first part or the <<structure box>> 18 illustrated on FIG. 2, designed to resist pressurization forces, and thus enable operation of the device while guaranteeing safety of the aircraft.
  the second, that is the aerodynamic fairing 13, used to reduce the impact of the structure box, by reducing the separation of flow when passing over the protuberance thus formed.

The structure box 18 is also used for operation of the said device through the front face 16. This front face 16 contains a glass that transmits the optical signal 17 between the atmosphere and the device. The glass used is flat, for technological manufacturing reasons and also for optical reasons. The use of a curved glass would have undesirable effects on the emitted and received optical beams.

This glass may be inclined at an angle $\alpha$ from the Oz axis, such that:
  $\alpha < 45°$ for optical reasons,
  $\alpha$ is as large as possible for aerodynamic reasons.

Figure 3:
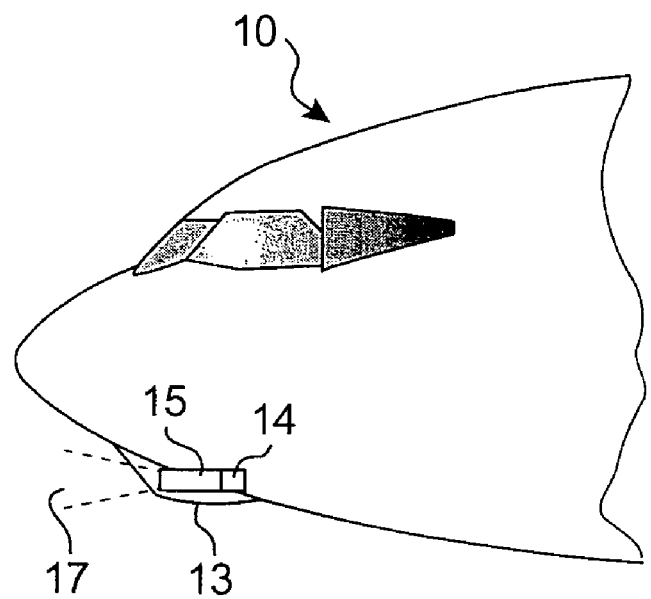
FIGS. 3 and 4 illustrate two other example embodiments.

FIG. 3 illustrates a second example embodiment that makes a compromise with the inclination of the glass to minimize the aerodynamic impact, while increasing the optical transmission factor.

Figure 4:
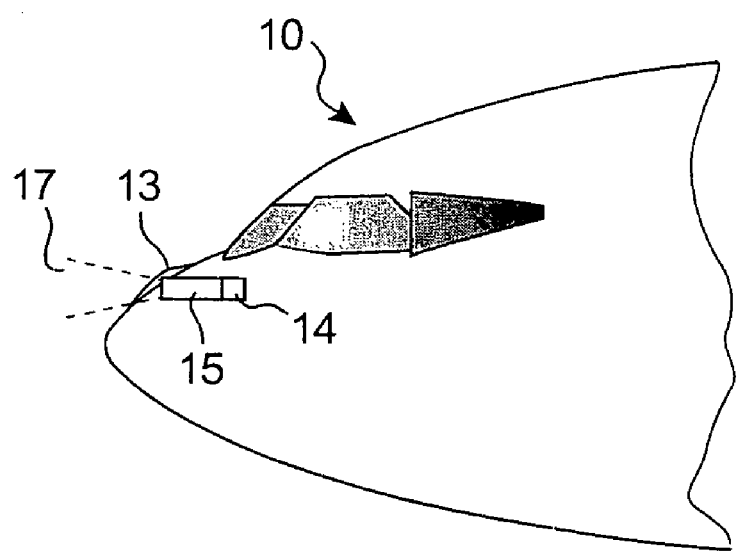

FIG. 4 illustrates a third example embodiment in which the location of the device is chosen so as to give detection/measurement information along the centerline of the aircraft.

A reduction in the size of this device for the purposes of series integration would facilitate installation of the device in the aircraft. The L-shape could thus be abandoned in preference for an inline system as shown on FIGS. 3 and 4, in which the two parts 14 and 15 of the lidar are located in line with each other.

The example in FIG. 3 makes it possible to considerably reduce the size of the fairing due to the reduction in the size of the device, and to integrate a fitting in which the device can be installed at the aircraft design stage (a sort of second landing gear compartment could be made to minimize the part external to the aircraft skin).

In the example shown in FIG. 4, a further attempt is made to reduce the impact of the fairing on the aerodynamics of the aircraft by choosing an area in which the angle of the skin with respect to the Oz axis is already low, to optimize the optical characteristics.

The invention claimed is:
1. An aircraft system comprising:
  a detection device connected to an aircraft and configured to detect atmospheric disturbances in the path of the aircraft, the connection between the detection device and the aircraft being disposed between a nose of the aircraft and landing gear of the aircraft;
  a structure box configured to resist pressurization forces while the aircraft is in flight and to separate the pressurized zone from the detection device, said structure box covering the detection device and located in the pressurized zone external and adjacent to the aircraft; and an aerodynamic fairing, which is a component distinct from the structure box, that covers the structure box with respect to an environment external to the aircraft, wherein the detection device is an "L" shaped light imaging detection and ranging (lidar) device, a vertical part of the L shape being located inside the aircraft, and a horizontal part of the L shape being located outside the aircraft and inside the structure box, wherein the structure box includes a flat glass portion on a front part of the structure box with respect to a longitudinal axis of the aircraft extending from the nose of the aircraft rearward, and wherein the structure box is a caisson.

2. The aircraft system according to claim 1, wherein the light imaging detection and ranging device is installed so as to be accessible via an avionics door of the aircraft.

3. The aircraft system according to claim 1, wherein the flat glass is disposed at an angle of less than 45° with respect to a vertical plane perpendicular to a horizontal plane formed by a longitudinal axis of the aircraft extending from the nose of the aircraft rearward and a transverse axis extending from one wing of the aircraft to another.

4. The aircraft system according to claim 1, wherein the fairing is disposed in contact with the structure box only on a side of the structure box opposite the aircraft.

5. The aircraft system according to claim 4, wherein the fairing extends farther toward a front of the aircraft than the light imaging detection and ranging device extends.

6. The aircraft system according to claim 5, wherein the fairing extends farther toward a rear of the aircraft than the light imaging detection and ranging device extends.

7. An aircraft system comprising:

an "L" shaped light imaging detection and ranging device configured to detect atmospheric disturbances in the path of an aircraft and connected to the aircraft, a vertical part of the L shape being disposed within the aircraft, and a horizontal part of the L shape being disposed external to the aircraft;

a structure box configured to resist pressurization forces, said structure box covering the device with respect to an environment external to the aircraft, said structure box connected to an external area of the aircraft; and an aerodynamic fairing, distinct from the structure box, covering the structure box to separate the structure box from the environment external to the aircraft, wherein the structure box includes a flat glass portion on a front part of the structure box with respect to a longitudinal axis of the aircraft extending from the nose of the aircraft rearward, and wherein the structure box is a caisson.

8. The aircraft system according to claim 7, wherein the flat glass is disposed at an angle of less than 45° with respect to a vertical plane perpendicular to a horizontal plane formed by a longitudinal axis of the aircraft extending from the nose of the aircraft rearward and a transverse axis extending from one wing of the aircraft to another.

9. The aircraft system according to claim 7, wherein the fairing is disposed in contact with the structure box only on a side of the structure box opposite the aircraft.

10. The aircraft system according to claim 9, wherein the fairing extends farther toward a front of the aircraft than the light imaging detection and ranging device extends.

11. The aircraft system according to claim 10, wherein the fairing extends farther toward a rear of the aircraft than the light imaging detection and ranging device extends.

* * * * *